United States Patent
Chae et al.

(10) Patent No.: US 7,027,123 B2
(45) Date of Patent: Apr. 11, 2006

(54) METHOD OF FABRICATING LIQUID CRYSTAL DISPLAY DEVICE

(75) Inventors: Kyung-Su Chae, Gyeongsangbuk-Do (KR); Yong-Sang Byun, Gyeongsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 61 days.

(21) Appl. No.: 10/669,377

(22) Filed: Sep. 25, 2003

(65) Prior Publication Data

US 2004/0126915 A1    Jul. 1, 2004

(30) Foreign Application Priority Data

Dec. 27, 2002 (KR) .................. 10-2002-0085618

(51) Int. Cl.
*G02F 1/13* (2006.01)
(52) U.S. Cl. .................................... 349/192
(58) Field of Classification Search ........... 349/192; 324/770
See application file for complete search history.

(56) References Cited

U.S. PATENT DOCUMENTS 6,300,998 B1 * 10/2001 Aruga .................. 349/192

FOREIGN PATENT DOCUMENTS

| KR | 10-2000-0014516 A | 3/2000 |
| KR | 10-2000-0038296 A | 7/2000 |
| KR | 2000-77285 | 12/2000 |

* cited by examiner

*Primary Examiner*—James A. Dudek
(74) *Attorney, Agent, or Firm*—McKenna Long & Aldridge LLP

(57) ABSTRACT

A method of fabricating a liquid crystal display device includes forming a first testing terminal along a side surface of a first substrate, forming a second testing terminal along a side surface of a second substrate, attaching the first and second substrates together to expose the first and second testing terminals, and conducting a lighting test using the first and second testing terminals.

21 Claims, 6 Drawing Sheets

METHOD OF FABRICATING LIQUID CRYSTAL DISPLAY DEVICE

The present invention claims the benefit of Korean Patent Application No. 85618/2002 filed in Korea on Dec. 27, 2002, which is hereby incorporated by reference.

BACKGROUND OF THE INVENTION

1. Field of the Invention

The present invention relates to a method of fabricating a display device, and particularly, to a method of fabricating a liquid crystal display device.

2. Description of the Related Art

As portable electric devices, such as mobile phones, personal digital assistants, and notebook computers, are being developed, requirements for flat panel display devices having lightweight and thin profiles are increasing. Among these flat panel display devices, such as liquid crystal displays (LCDs), plasma display panels (PDPs), field emission displays (FEDs), and vacuum fluorescent displays (VFDs), the LCDs are desirable due to their ability to be mass produced, their easy driving means, and their realization of high quality images.

Figure 1:
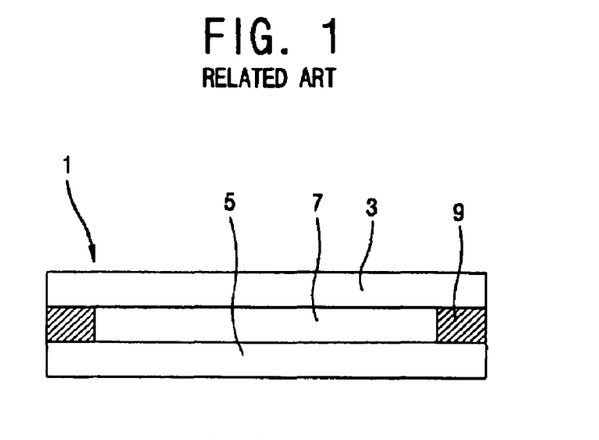
FIG. 1 is a cross sectional view of a liquid crystal display device according to the related art.

FIG. 1 is a cross sectional view of a liquid crystal display device according to the related art. In FIG. 1, a liquid crystal display device 1 includes a lower substrate 5 (i.e., a driving device array substrate), an upper substrate 3 (i.e., a color filter substrate), and a liquid crystal layer 7 formed between the lower and upper substrates 5 and 3. Although not shown, a plurality of pixels are formed on the lower substrate 5, a driving device, such as a thin film transistor, is formed on each of the pixels, and a color filter layer is formed on the upper substrate 3 for producing colored images. In addition, a pixel electrode (not shown) and a common electrode (not shown) are formed on the lower substrate 5 and the upper substrate 3, respectively, and an alignment layer (not shown) for orienting liquid crystal molecules of the liquid crystal layer 7 is applied thereon.

The lower substrate 5 and the upper substrate 3 are attached together using a sealing material 9, wherein the liquid crystal layer 7 formed therebetween. Accordingly, by driving liquid crystal molecules using the driving device formed on the lower substrate 5, light passing through the liquid crystal layer 7 is controlled. Thus, images are displayed.

Figure 2:
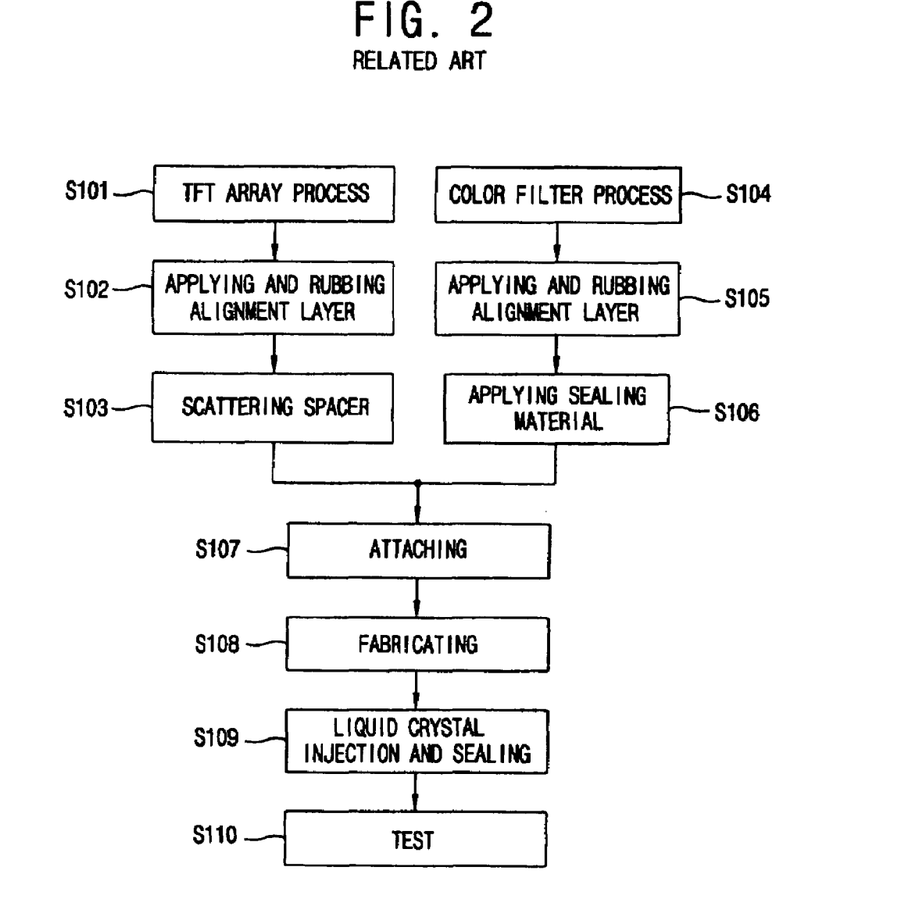
FIG. 2 is a flow chart of a method of fabricating a liquid crystal display device according to the related art.

FIG. 2 is a flow chart of a method of fabricating a liquid crystal display device according to the related art. In FIG. 2, a method of fabricating the liquid crystal display device can be divided into a driving device array substrate process for forming the driving device on a lower substrate, a color filter substrate process for forming a color filter on an upper substrate, and a cell process for forming display cells.

A step S101 (TFT array process) includes forming a plurality of gate lines and data lines on the lower substrate to define pixel areas and forming a thin film transistor at each of the pixel areas. Accordingly, the TFT is driven by signals transmitted along the gate and data lines. In addition, the pixel electrode is formed during the driving device array process.

A step S104 (color filter process) includes forming color filter layer of R, G, and B colors and a common electrode on the upper substrate.

Steps S102 and S105 (applying and rubbing alignment layer) include applying alignment layers on both the upper substrate and the lower substrate, and rubbing the alignment layers to provide the liquid crystal molecules of the liquid crystal layer formed between the upper and lower substrates with an anchoring force or a surface fixing force (i.e., pre-tilt angle and orientation direction).

Step S103 (scattering spacer) includes providing spacers on the lower substrate 5 to maintain a constant cell gap between the upper and lower substrates.

Step S106 (applying sealing material) includes applying a sealing material along an outer perimeter of the upper substrate.

Step S107 (attaching) includes attaching the upper substrate and the lower substrate together by compressing the upper and lower substrates together.

Step S108 (fabricating) includes dividing (i.e., cutting) the attached upper and lower substrates into single liquid crystal display panels.

Step S109 (liquid crystal injection and sealing) includes injecting liquid crystal into each of the single liquid crystal panels through a liquid crystal injecting hole, and sealing the liquid crystal injecting hole.

Step S110 (test) includes examining each of the liquid crystal panels for defects.

Figure 3:
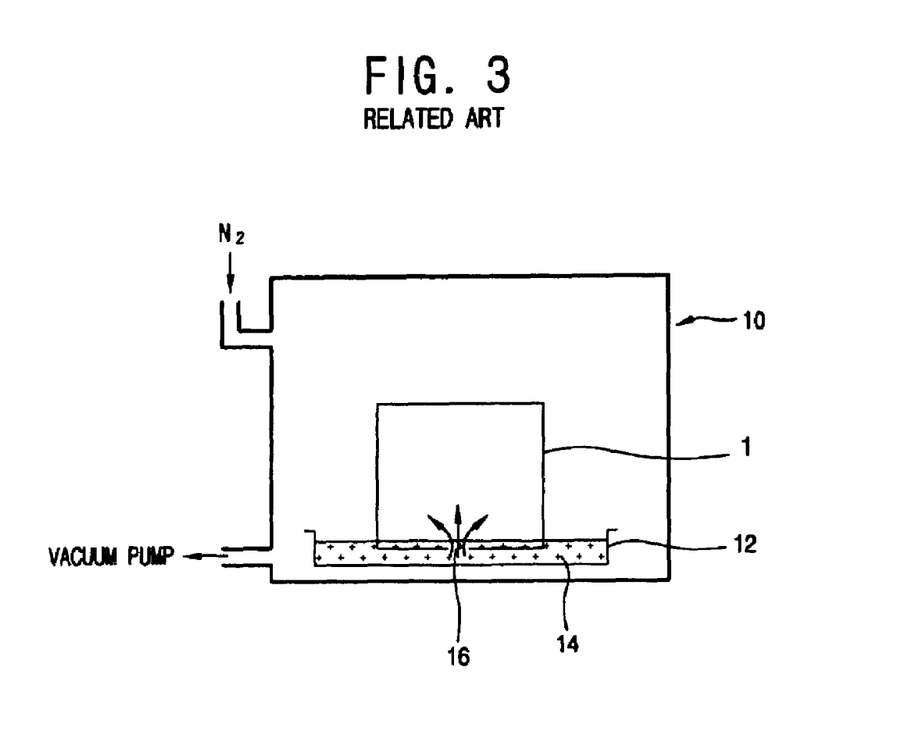
FIG. 3 is a schematic view of a liquid crystal injection system according to the related art.

FIG. 3 is a schematic view of a liquid crystal injection system according to the related art. In FIG. 3, nitrogen ($N_2$) gas is supplied into a vacuum chamber 10 when an injection hole 16 of liquid crystal panel 1 contacts liquid crystal 14 in a container 12. Then, pressure within the vacuum chamber 10 is reduced and the liquid crystal is injected into the liquid crystal panel 1 through the injection hole 16 due to a difference between the pressure inside the liquid crystal panel 1 and the vacuum chamber 10. In addition, the injection hole 16 is completely sealed by a sealing material after filling of the liquid crystal into the liquid crystal panel 1. Accordingly, a liquid crystal layer is formed between upper and lower substrates of the liquid crystal panel 1.

However, since the liquid crystal is injected through the injection hole 16 of the liquid crystal panel 1 due to pressure differences between the liquid crystal panel 1 and the vacuum chamber 10, it takes a long time to inject the liquid crystal. Since a gap between the lower substrate (i.e., driving device array substrate) and the upper substrate (i.e., color filter substrate) of the liquid crystal panel 1 is very narrow, (i.e., a few μm), only a small amount of liquid crystal can be injected into the liquid crystal panel 1 per unit time. For example, it takes about 8 hours to completely inject the liquid crystal into a liquid crystal panel having sides of about 15 inches. Thus, total fabrication time of the liquid crystal panel 1 increases due to the liquid crystal injection.

SUMMARY OF THE INVENTION

Accordingly, the present invention is directed to a method of fabricating a liquid crystal display device that substantially one or more of the problems due to limitations and disadvantages of the related art.

An object of the present invention is to provide a method of fabricating a liquid crystal display device having improved processing efficiency.

Another object of the present invention is to provide a method of fabricating a liquid crystal display device that prevents generation of inferior liquid crystal panels.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming a first testing terminal along a side surface of a first substrate, forming a second testing terminal along a side surface of a second substrate, attaching the first and second substrates together to expose the first and second testing terminals, and conducting a lighting test using the first and second testing terminals.

In another aspect, a method of fabricating a liquid crystal display (LCD) device includes providing a first substrate upon which a plurality of color filter substrates and a first testing terminal are formed, providing a second substrate upon which a plurality of thin film transistor array substrates corresponding to the color filter substrates are formed, the second substrate includes a second testing terminal, applying a sealing material along outer portions of the color filter substrates on the first substrate, dispensing liquid crystal onto the second substrate, attaching the first and second substrates together so that the first and second testing terminals are exposed, conducting a first defect test of the first and second substrates by supplying voltages to the first and second testing terminals, and dividing the attached first and second substrates into a plurality of individual liquid crystal panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
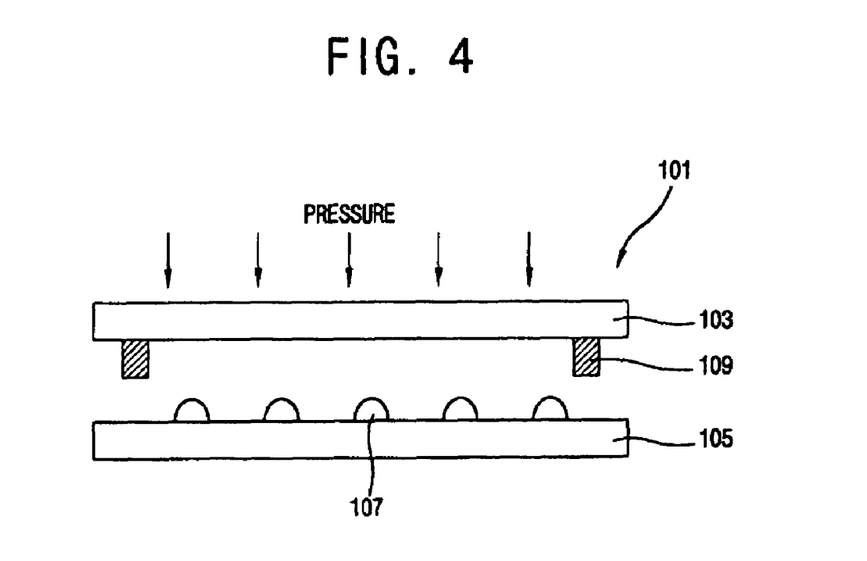
FIG. 4 is a cross sectional view of an exemplary method of fabricating a liquid crystal display device according the present invention.

FIG. 4 is a cross sectional view of an exemplary method of fabricating a liquid crystal display device according the present invention. In FIG. 4, liquid crystal 107 of a drop shape may be dropped on a lower substrate 105 before attaching the lower substrate 105 and an upper substrate 103 together. For example, the lower substrate 105 may include thin film transistors and the upper substrate 103 may include color filters. The liquid crystal 107 may be dropped onto the upper substrate 103 upon which the color filters may be formed. Alternatively, the liquid crystal 107 may be dropped onto the lower substrate 105 upon which the thin film transistors may be formed. However, the one of the upper and lower substrates 103 and 105 upon which the liquid crystal 107 is dropped should be disposed as a lower part when the upper and lower substrates 103 and 105 are attached.

At that time, a sealing material 109 may be applied along an outer portion of the upper substrate 103, thereby the upper and lower substrates 103 and 105 may be attached together by compressing the upper and lower substrates 103 and 105 together. Accordingly, each of the liquid crystal 107 drops may be dispersed due to the applied pressure, whereby a liquid crystal layer of even thickness may be formed between the upper and lower substrates 103 and 105. Therefore, the liquid crystal dispensing method according to the present invention includes attaching the upper and lower substrates 103 and 105 using the sealing material 109 after the dispensing of the liquid crystal onto a lowermost one of the upper and lower substrates 103 and 105.

Figure 5:
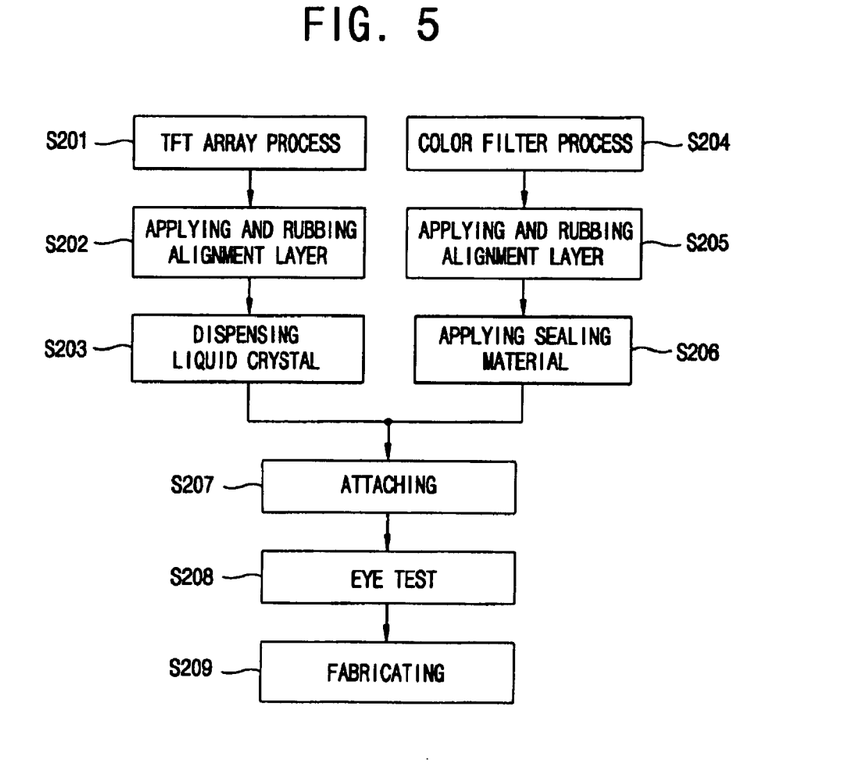
FIG. 5 is a flow chart of an exemplary method of fabricating a liquid crystal display device according to the present invention.

FIG. 5 is a flow chart of an exemplary method of fabricating a liquid crystal display device according to the present invention. In FIG. 5, a step S201 (TFT array process) may include forming a plurality of gate lines and data lines on a lower substrate to define pixel areas and forming a thin film transistor at each of the pixel areas. Accordingly, the TFT may be driven by signals transmitted along the gate and data lines. In addition, the pixel electrode may be formed during the driving device array process.

A step S204 (color filter process) may include forming a color filter layer of R, G, and B colors and a common electrode on an upper substrate.

Steps S202 and S205 (applying and rubbing alignment layer) may include applying alignment layers on both the upper substrate and the lower substrate, and rubbing the alignment layers to provide the liquid crystal molecules of the liquid crystal layer formed between the upper and lower substrates with an anchoring force or a surface fixing force (i.e., pre-tilt angle and orientation direction).

Step S203 (dispensing liquid crystal) may include dropping liquid crystal onto liquid crystal areas of the lower substrate.

Step S206 (applying sealing material) may include applying a sealing material along an outer portion of each of a plurality of liquid crystal panels formed on the upper substrate.

Step S207 (attaching) may include attaching the lower and upper substrates together by compressing both the lower and upper substrates together. Accordingly, the dropped liquid crystal may be evenly dispersed across each of the plurality of liquid crystal panels.

Step S208 (eye test) may include visual inspection of the attached lower and upper substrates using a polarizer, for example, wherein each of the plurality of liquid crystal panels may be individually inspected.

Step S209 (fabricating) may include dividing (i.e., cutting) the attached lower and upper substrates into single liquid crystal panels that correspond to the plurality of liquid crystal panels.

Figure 6:
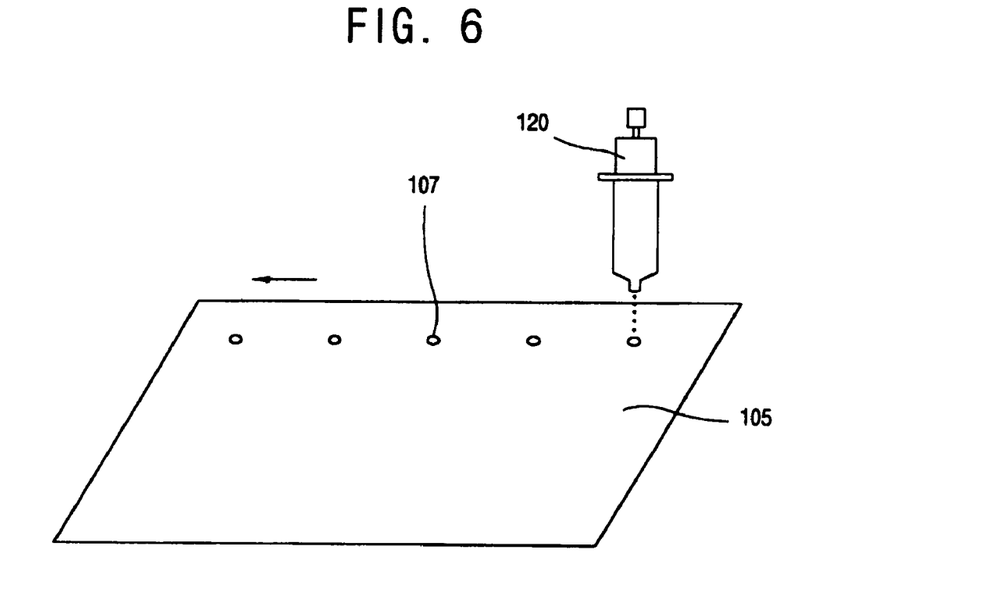
FIG. 6 is a perspective view of an exemplary liquid crystal dispensing method according to the related art.

FIG. 6 is a perspective view of an exemplary liquid crystal dispensing method according to the related art. In FIG. 6, a dispenser 120 drops dropped-shaped liquid crystal 107 onto a surface of a substrate 105. Accordingly, the substrate 105 moves along a first direction while the dispenser 120 remains fixed. Alternatively, the dispenser 120 may move along a first direction while the substrate 105 remains fixed.

Figure 7:
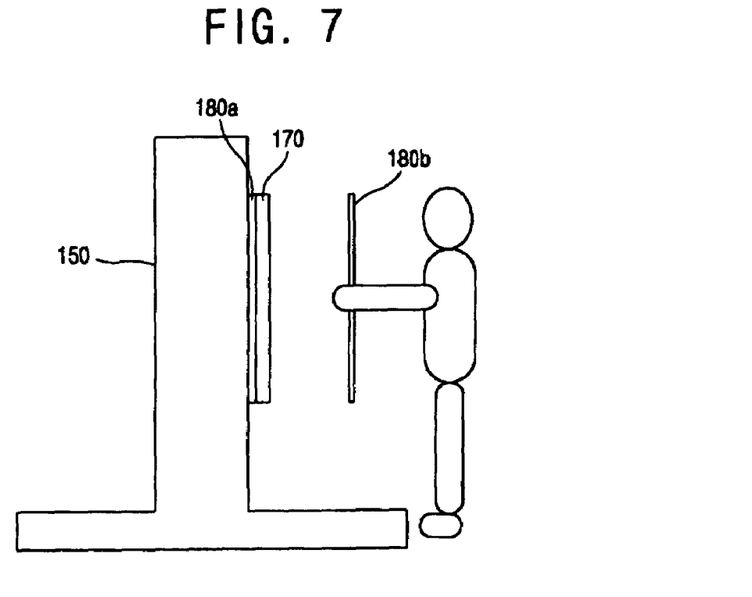
FIG. 7 is a schematic view of an exemplary eye test method according to the related art.

FIG. 7 is a schematic view of an exemplary eye test method according to the related art. In FIG. 7, an eye test method may include disposing a first polarizer 180a on a rear surface of a glass substrate (undivided upper and lower substrates) 170 upon which a plurality of liquid crystal panels have been formed. Then, the glass substrate 170 is placed onto a light box 150, and light is irradiated onto the glass substrate 170, and a second polarizer 180b is rotated to examine spots shown through the second polarizer 180b. Accordingly, the spots may indicate the presence of large impurities or inferior results from the rubbing processes. Thus, detection of the spots prior to dividing the glass substrate into individual liquid crystal cells may improve production yield. However, detection of inferior elements detected through the eye test may be limited. For example, a line defect, such as an electrical short circuit and an electrical open circuit, may not generate a spot of the second polarizer 180b.

Figure 8:
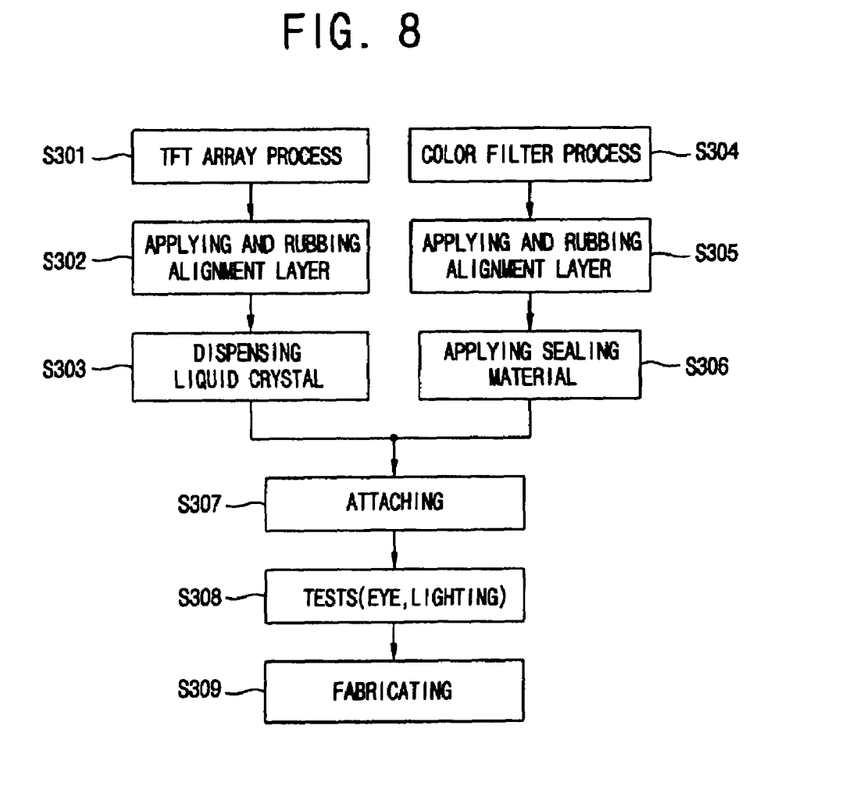
FIG. 8 is a flow chart of another exemplary method of fabricating a liquid crystal display device according to the present invention.

FIG. 8 is a flow chart of another exemplary method of fabricating a liquid crystal display device according to the present invention. In FIG. 8, steps S301–S309 may include processes similar to those of FIG. 5. However, step S308 may include an additional lighting test that may detect line defects or driving defects of thin film transistors by forming an additional testing terminal along an outer portion of the upper and lower substrates and applying a signal to the terminal while observing the transmitted light using the second polarizer 180b. However, since the gap between the attached upper and lower substrates may be very narrow (i.e., a few μm), it may be difficult to form the testing terminal and to apply the signal from an exterior of the panel. Thus, the lighting test may not be performed. In order to solve these problems, the testing terminals may be formed along side surfaces of the TFT array substrate and the color filter substrate to be exposed after attaching upper and lower substrates. Accordingly, the eye test and the lighting test may be performed simultaneously before the cutting and dividing processes to prevent generation of inferior liquid crystal panels.

Figure 9A:
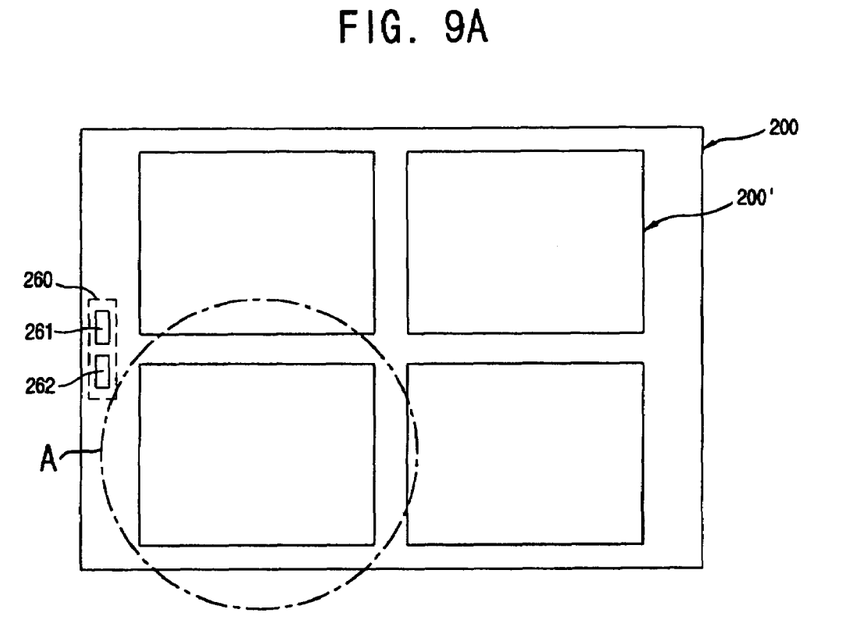
FIG. 9A is a plan view of an exemplary lower substrate of a liquid crystal display device according to the present invention.
Figure 9B:
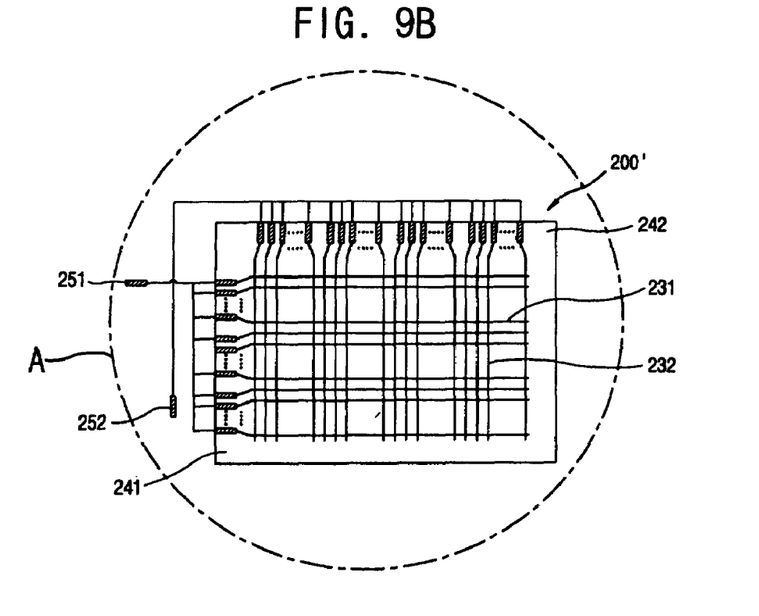
FIG. 9B is an enlarged plan view of region A of FIG. 9A according to the present invention.

FIG. 9A is a plan view of an exemplary lower substrate of a liquid crystal display device according to the present invention, and FIG. 9B is an enlarged plan view of region A of FIG. 9A according to the present invention. In FIG. 9A, a lower substrate 200 may include a plurality of unit panel areas 200' and a testing terminal 260 having a gate testing terminal 261. A data testing terminal 262 is formed along one side of a dummy area of the lower substrate 200. In FIG. 9B, a plurality of gate lines 231 and a plurality of data lines 232 for defining pixel areas may be arranged along longitudinal and transverse directions on the respective panel area 200'. A TFT (not shown) may be formed at crossing portions of the gate line 231 and the data line 232 to function as a switching device. Although not shown, the TFT may include a gate electrode drawn from the gate line 231, source/drain electrodes drawn from the data line 232, and an active layer, the drain electrode may be electrically connected to a pixel electrode formed on the pixel area. In addition, a gate pad 241 and a data pad 242 may be formed on end portions of the gate line 231 and the data line 232, respectively, for supplying signals to the gate and data lines 231 and 232. Moreover, a gate shorting bar 251 and a data shorting bar 252 may be integrally formed along an outer portion of the panel for connecting the gate pads 241 and the data pads 251, respectively. Thus, in FIG. 9A, the gate and data testing bars 261 and 262 may be formed by respectively connecting the gate and data shorting bars 251 and 252 formed on the respective unit panel area 200'. Accordingly, the gate and data testing bars 261 and 262 may be used to perform electric tests for detecting line defects of the liquid crystal panel and the driving defects of the TFT after the attaching process.

Although it is not shown, color filter layers and a common electrode corresponding to the pixel electrode may be formed on the upper substrate, and the testing terminal may be formed to extend from the common electrode along a side surface of the upper substrate. Alternatively, the testing terminal may be formed on the lower substrate without forming an additional testing terminal on the upper substrate.

Figure 10A:
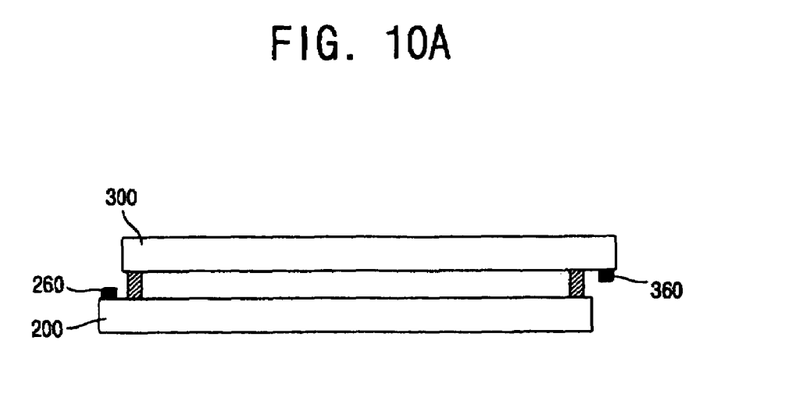
FIGS. 10A and 10B are cross sectional and perspective views of an exemplary liquid crystal display device according to the present invention.
Figure 10B:
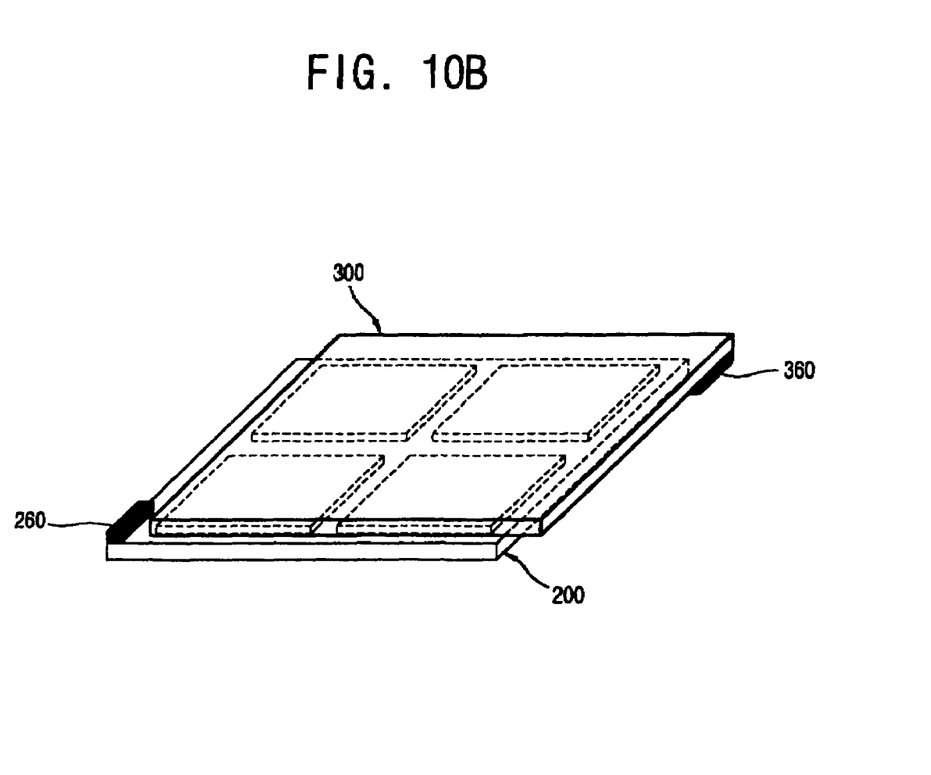

FIGS. 10A and 10B are cross sectional and perspective views of an exemplary liquid crystal display device according to the present invention. In FIGS. 10A and 10B, a lower substrate 200 and an upper substrate 300 may be attached together so that testing terminals 260 formed along sides of the lower and upper substrates 200 and 300 are not covered by corresponding sides of the respective substrates 200 and 300. Accordingly, when the glass substrate (lower and upper substrates 200 and 300) upon which a plurality of liquid crystal panels may be formed may undergo a panel test process to detect defects generated during previous processes.

The panel test process may be similar to the test processes of FIGS. 5, 7, and 8. For example, after the eye test, the light test may be performed. The lighting test may detect line defects, such as electrical short circuit and electrical open circuit, of the gate lines and data lines formed on the unit liquid crystal panel. In addition, the lighting test may detect driving defects of the TFT by supplying voltages to the testing terminals 260 and 360.

If a defect is not detected on the glass substrate (lower and upper substrates) after the eye test and the lighting test, the glass substrate may be processed and may be divided (i.e., cut) into a plurality of individual liquid crystal panels. However, if a defect is detected during the test process, inferior elements generated during previous processes may be detected and repaired to remove the defects. Then, the liquid crystal panel may be divided into a plurality of individual liquid crystal panels.

It will be apparent to those skilled in the art that various modifications and variations can be made in the method of fabricating a liquid crystal display device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising:
    forming a first testing terminal along a side surface of a first substrate;
    forming a second testing terminal along a side surface of a second substrate;
    attaching the first and second substrates together to expose the first and second testing terminals;
    conducting a lighting test using the first and second testing terminals; and
    forming a plurality of individual liquid crystal panels by cutting the first and second substrates after conducting the lighting test.

2. The method according to claim 1, further comprising a step of conducting an eye test for detecting defects of the liquid crystal display device by disposing a first polarizer at a rear surface of one of the first and second substrates and a second polarizer at a rear surface of another of the first and second substrates, and rotating one of the first and second polarizers.

3. The method according to claim 1, further comprising a step of dispensing liquid crystal on one of the first and second substrates.

4. The method according to claim 1, wherein preparing the first substrate comprises:
    providing a transparent substrate;
    forming a color filter on the transparent substrate; and
    forming a common electrode on the color filter.

5. The method according to claim 4, wherein the steps of forming a common electrode and forming a first testing terminal are performed simultaneously.

6. The method according to claim 4, wherein the common electrode is formed to be electrically connected to the first testing terminal.

7. The method according to claim 1, wherein providing the second substrate comprises:
    providing a transparent substrate on which pixel areas are defined;
    forming gate lines and a gate shorting bar for interconnecting the gate lines on the transparent substrate;
    forming data lines insulated from and crossing the gate lines and a data shorting bar for interconnecting the data lines; and
    forming a pixel electrode on the pixel area.

8. The method according to claim 7, wherein the step of forming a gate shorting bar includes forming a gate testing terminal connecting the gate shorting bar.

9. The method according to claim 8, wherein the gate testing terminal is connected to one of the first and second testing terminals.

10. The method according to claim 7, wherein the step of forming a data shorting bar includes forming a data testing terminal connecting the data shorting bar.

11. The method according to claim 8, wherein the data testing terminal is connected to one of the first and second testing terminals.

12. A method of fabricating a liquid crystal display (LCD) device, comprising:
    providing a first substrate upon which a plurality of color filter substrates and a first testing terminal are formed;
    providing a second substrate upon which a plurality of thin film transistor array substrates corresponding to the color filter substrates are formed, the second substrate includes a second testing terminal;
    applying a sealing material along outer portions of the color filter substrates on the first substrate;
    dispensing liquid crystal onto the second substrate;
    attaching the first and second substrates together so that the first and second testing terminals are exposed;
    conducting a first defect test of the first and second substrates by supplying voltages to the first and second testing terminals; and
    dividing the attached first and second substrates into a plurality of individual liquid crystal panels.

13. The method according to claim 12, further comprising a step of conducting a second defect test by disposing a first polarizer at a rear surface of one of the first and second substrates and a second polarizer at a rear surface of another of the first and second substrates, and rotating one of the first and second polarizers.

14. The method according to claim 12, wherein the first substrate includes a color filter and a common electrode on the color filter.

15. The method according to claim 14, wherein the common electrode and the first testing terminal are formed simultaneously.

16. The method according to claim 14, wherein the common electrode is eletrically connected to the first testing terminal.

17. The method according to claim 12, wherein the second substrate includes a gate shorting bar for interconnecting a plurality of gate lines, and a data shorting bar for interconnecting a plurality of data lines.

18. The method according to claim 17, wherein the gate shorting bar includes a gate testing terminal connecting the gate shorting bar.

19. The method according to claim 18, wherein the gate testing terminal is connected to one of the first and second testing terminals.

20. The method according to claim 17, wherein the data shorting bar includes a data testing terminal connecting the data shorting bar.

21. The method according to claim 20, wherein the data testing terminal is connected to one of the first and second testing terminals.

* * * * *